T. S. DICKERSON & R. M. WHIPPLE.
Process and Apparatus for Using Liquid Fuel for Producing Heat and Light.
No. 5,326. Reissued March 18, 1873.
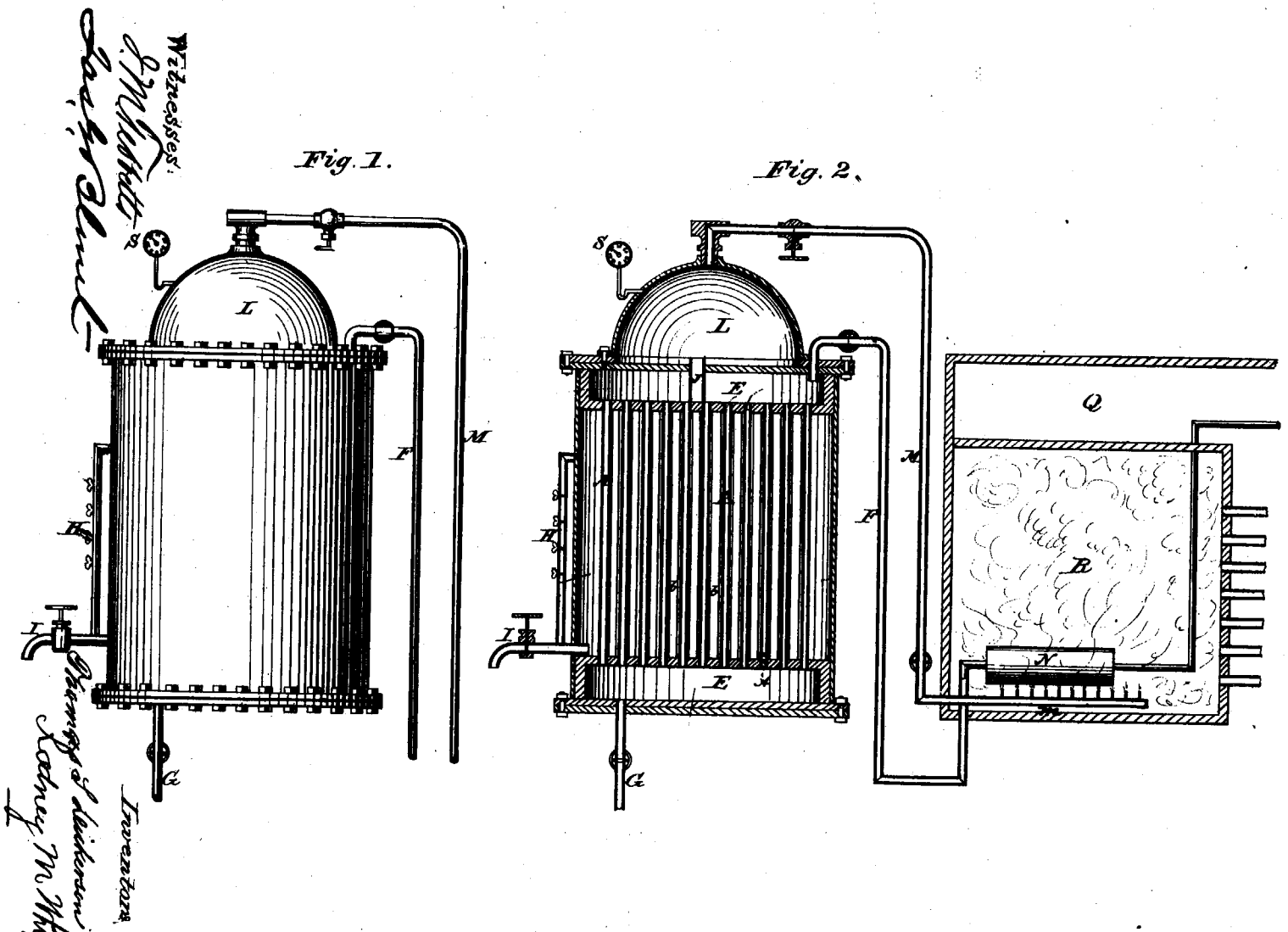
THE NORRIS PETERS CO., PHOTO-LITHO., WASHINGTON, D. C.

UNITED STATES PATENT OFFICE.

THOMAS S. DICKERSON AND RODNEY M. WHIPPLE, OF CHICAGO, ILLINOIS.

IMPROVEMENT IN PROCESSES AND APPARATUS FOR USING LIQUID FUEL FOR PRODUCING HEAT AND LIGHT.

Specification forming part of Letters Patent No. 102,662, dated May 3, 1870; reissue No. 5,326, dated March 18, 1873.

*To all whom it may concern:*

Be it known that we, THOMAS S. DICKERSON and RODNEY M. WHIPPLE, both of Chicago, in the State of Illinois, have discovered and invented a new and Improved Mode of Generating and Manufacturing Vapor or Gas from Oil, Petroleum, and other oleaginous and carbonaceous substances, and using the same in combination with superheated steam, vapor, and gas from water and applying the same to purposes of illumination, heat, and propulsion of machinery, the same being a new and useful invention and apparatus for the purposes aforesaid; and we do hereby declare that the following is a full, clear, and exact description of the same, reference being had to the accompanying drawing forming a part of this specification, in which—

Figure 1 represents an elevation of the invention or machine, showing the external of the generator and its connections. Fig. 2 represents a sectional view of the generator, fire-box, superheater, and their connections taken in line of center.

Similar letters of reference in the several figures indicate corresponding parts.

The nature of our invention consists in producing vapor or gas from oil, petroleum, and other oleaginous and carbonaceous substances by means of superheated steam, and by uniting and using the same with other steam or superheated steam, operating in the manner hereinafter described. By using superheated steam for vaporizing the oil the formation and deposition of solid carbon is prevented by the diffusion and application of heat, in such manner and degree as is necessary without decomposing it, and, by mixing superheated steam with the vapor or gas thus produced, we increase the heat, combine the vapors, produce gases for heating and illuminating purposes, secure perfect combustion, and save largely in the amount of carbonaceous substances required.

To enable others skilled in the art to make and use our invention and apparatus, we proceed to describe its construction and mode of operation.

The generator for producing the gas or vapor is composed of a cylinder made of boiler-iron, with tube-heads riveted to the cylinder at each end. Inside of the tube-sheets, which are turned up about two inches, are cast or wrought iron rings, riveted to the tube-sheets and cylinder. This is done so that the heads may be bolted on to form a steam-space about two inches wide at each end of the cylinder. The tube heads or sheets are connected by copper tubes about five-eighths of an inch in diameter and about one-fourth of an inch apart inside the cylinder. The tubes connecting the steam-spaces are shown by letters A A, Fig. 2. The space in the cylinder around the tubes, as shown by letters *b b*, is filled with the oil. The upper head of the cylinder and the upper tube-sheet are connected and secured by bolts, as shown, with one large pipe or opening from the oil-space below to the dome above, thus allowing the gas or vapor to escape from the oil-space below into the dome above. Letters E E represent steam-spaces between the double heads at each end of the generator, which, being connected by the steam-pipes A A, secure complete circulation of the superheated steam and expose the oil in the generator to the greatest practicable amount of heating-surface. Letter F represents a steam-pipe from the superheater in the fire-box into the machine. Letter G represents an escape-pipe from the generator to carry off the condensed steam. Letter H represents a metallic tube leading from the oil-space in the generator or from the pipe I, and affixed to the outside of the machine with stop-cocks, suitably arranged, by which to ascertain the amount of oil in the generator. Letter I represents a pipe, through which the oil is pumped into the oil-space *b b*. Letter L represents the dome, which caps the machine, and is secured firmly by bolts and nuts to the generator below. Letter M represents the vapor or gas-pipe leading from the top of the dome into the fire-chamber. Letter N represents a superheater placed in the fire-box, composed of a cast-iron cylinder filled with scraps or pieces of iron, and secured with steam-tight heads, through one of which steam is introduced from the boiler, and through the other superheated steam is conveyed by the connecting-pipes to the machine. Letters Q Q represent the boiler, from whence steam is taken by pipe to the superheater. Letters R R represent the fire-box filled with flame from the burning vapors or gases. Letter S represents a common steam-gage, by which to show the pressure of the gases or vapors upon the machine. Letter I exhibits the pipe used for drawing the oil from the generator.

The mode of operating the machine is as follows, to wit: Steam is taken from the boiler Q by the pipe F into the superheater N and there superheated by the combustion in the fire-box R, from whence it passes with great force of pressure through the pipe F into the steam-space E in the generator, instantly filling the steam-tubes A A and the other steam-space E with the superheated steam, and thereby heating the oil in the space *b b* in the generator, so that it is immediately converted into gas or vapor and passes off through the opening J into the dome, and is then taken through the gas-pipe M to the point of combustion.

Suitable stop-cocks, valves, and wire-nettings should be placed between all the connections, always under the control of the engineer, by which the utmost safety may be secured.

The word "oil" whenever and wherever it occurs, and standing alone as descriptive of the material from which gas or vapor is produced in the generator, is intended to include and describe any and every oleaginous and carbonaceous substance which may or can be introduced into the generator in a liquid or fluid state.

The advantages gained by our invention are, that the apparatus is more compact and simple, making it especially adapted for use on locomotives and other portable engines.

We have described a suitable form of superheater, but any other known form of apparatus used for superheating steam may be employed.

We have described our invention with special reference to the burning of petroleum, coal-oil, shale-oil, and the like; but we do not limit ourselves to the use of those materials, since there is a large number of hydrocarbons which may be vaporized by superheated steam and then mixed and combined with steam or superheated steam, so as to produce the combustible gas or vapor, which constitutes one part of our invention.

We do not claim a gas-holder, except a dome, directly or indirectly connected with the generator, or any casing outside the walls of the generator, or any gas-chamber, arranged to envelop the generator, to be used as a gas-holder, as such have long been in use in portable gas-machines; nor do we claim a series of tubes to carry off the gas or vapor from the oil-space to the dome.

One single opening, such as are used in stills or gas-retorts, is all that is required. Any ordinary opening or pipe to pass off the vapor is all that is required, and is easily constructed, as the distance across the steam-space in the largest machines will not exceed two and one-half inches.

Having described our invention, parts of which are already secured to us by Letters Patent, numbered 95,665, and dated October 12, 1869, reference thereunto being had, and without now claiming anything therein contained, what we now claim, and wish to secure by Letters Patent, is—

1. The improved apparatus herein described, composed of a steam-boiler, superheater, gas-generator, arranged and combined as described.

2. The steam-pipe F, to supply steam to the apparatus, for the purpose described.

3. The process herein described for burning petroleum and other vaporizable hydrocarbons, the same consisting in first vaporizing the gas-producing material by means of superheated steam and then mixing with the gas or vapor superheated steam, substantially as described.

The above specification signed by us.

THOMAS S. DICKERSON.
RODNEY M. WHIPPLE.

Witnesses as to the signature of THOS. S. DICKERSON:

E. B. SHERMAN,
CHARLES E. BYRNE.

Witnesses as to the signature of RODNEY M. WHIPPLE:

JNO. D. PATTEN,
D. P. COWL.